(12) United States Patent
Cohen et al.

(10) Patent No.: US 7,876,763 B2
(45) Date of Patent: Jan. 25, 2011

(54) PIPELINE SCHEDULER INCLUDING A HIERARCHY OF SCHEDULERS AND MULTIPLE SCHEDULING LANES

(75) Inventors: Earl T. Cohen, Fremont, CA (US); Robert Olsen, Dublin, CA (US); Eugene M. Feinberg, Sunnyvale, CA (US); Gregory L. Ries, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1127 days.

(21) Appl. No.: 10/913,055

(22) Filed: Aug. 5, 2004

(65) Prior Publication Data

US 2006/0029079 A1    Feb. 9, 2006

(51) Int. Cl.
   *H04L 12/28* (2006.01)
(52) U.S. Cl. .................. 370/395.42; 370/408; 370/412
(58) Field of Classification Search ......... 370/412–418, 370/232, 395.1–395.5, 230–235, 428, 429, 370/477, 537, 408, 411, 444, 399, 395.42
   See application file for complete search history.

(56) References Cited

U.S. PATENT DOCUMENTS

| | | | |
|---|---|---|---|
| 5,751,708 A * | 5/1998 | Eng et al. | 370/395.42 |
| 5,850,399 A * | 12/1998 | Ganmukhi et al. | 370/412 |
| 5,864,540 A | 1/1999 | Bonomi et al. | |
| 5,864,557 A * | 1/1999 | Lyons | 370/444 |
| 5,892,766 A * | 4/1999 | Wicki et al. | 370/412 |
| 6,130,878 A | 10/2000 | Charny | |
| 6,337,851 B1 | 1/2002 | Charny et al. | |
| 6,389,019 B1 * | 5/2002 | Fan et al. | 370/395.42 |
| 6,408,005 B1 | 6/2002 | Fan et al. | |
| 6,412,000 B1 | 6/2002 | Riddle et al. | |
| 6,430,154 B1 | 8/2002 | Hunt et al. | |

(Continued)

FOREIGN PATENT DOCUMENTS

EP    0 981 228 A2    2/2000

(Continued)

OTHER PUBLICATIONS

A. Ioannou & M. Katevenis, Pipelined Heap (Priority Queue) Management for Advanced Scheduling In high-Speed Networks,2001, IEEE, 0-7803-7097,2043-2047.*

(Continued)

*Primary Examiner*—Aung S Moe
*Assistant Examiner*—Vinncelas Louis
(74) *Attorney, Agent, or Firm*—The Law Office of Kirk D. Williams

(57) ABSTRACT

Disclosed is a hierarchy of individual schedulers with multiple scheduling lanes for scheduling items, such as, but not limited to packets or indications thereof, such that different classes of priority items can be propagated through the hierarchy of schedulers accordingly. A pipeline scheduler typically includes a root scheduler and one or more layers of schedulers with each of these layers including at least one scheduler. Each scheduler is configured to maintain items of different scheduling categories received from each of the particular scheduler's immediate children schedulers within the pipeline scheduler if any and from each immediate external source coupled to the particular scheduler if any, and to schedule the sending of the items of the different scheduling categories currently maintained to its parent schedule or external scheduler client. The items may correspond to packets, indications of packets, or any other entity.

34 Claims, 7 Drawing Sheets

U.S. PATENT DOCUMENTS

| | | | |
|---|---|---|---|
| 6,438,134 B1* | 8/2002 | Chow et al. | 370/412 |
| 6,449,650 B1* | 9/2002 | Westfall et al. | 709/228 |
| 6,483,839 B1* | 11/2002 | Gemar et al. | 370/395.42 |
| 6,560,230 B1* | 5/2003 | Li et al. | 370/395.42 |
| 6,643,293 B1* | 11/2003 | Carr et al. | 370/399 |
| 6,691,312 B1 | 2/2004 | Sen et al. | |
| 6,834,053 B1* | 12/2004 | Stacey et al. | 370/395.4 |
| 6,836,475 B2 | 12/2004 | Chaskar et al. | |
| 6,876,952 B1 | 4/2005 | Kappler et al. | |
| 6,909,691 B1* | 6/2005 | Goyal et al. | 370/230 |
| 7,277,448 B1* | 10/2007 | Long et al. | 370/412 |
| 7,336,662 B2* | 2/2008 | Hassan-Ali et al. | 370/395.21 |
| 7,417,999 B1* | 8/2008 | Charny et al. | 370/408 |
| 7,522,609 B2* | 4/2009 | Cohen et al. | 370/395.42 |
| 2001/0001608 A1* | 5/2001 | Parruck et al. | 370/232 |
| 2003/0123449 A1* | 7/2003 | Kuhl et al. | 370/395.1 |
| 2004/0081165 A1 | 4/2004 | Carr et al. | |
| 2004/0177087 A1* | 9/2004 | Wu et al. | 707/102 |
| 2004/0230675 A1* | 11/2004 | Freimuth et al. | 709/223 |
| 2005/0047415 A1* | 3/2005 | Channegowda et al. | 370/395.4 |
| 2005/0047425 A1* | 3/2005 | Liu et al. | 370/411 |
| 2005/0152374 A1* | 7/2005 | Cohen et al. | 370/395.4 |
| 2005/0163140 A1* | 7/2005 | Dally et al. | 370/412 |
| 2005/0243853 A1* | 11/2005 | Bitar et al. | 370/432 |
| 2005/0249220 A1* | 11/2005 | Olsen et al. | 370/395.4 |
| 2009/0207846 A1 | 8/2009 | Cohen et al. | |

OTHER PUBLICATIONS

Varma et al, A general Methodology for Designing Efficient Traffic Scheduling and Shaping Algorithms, 1997, IEEE.*

Bennett et al., "Hierarchical Packet Fair Queueing Algorithms," IEEE/ACM Transactions on Networking (TON), vol. 5, Issue 5, Oct. 1997, pp. 675-689.

Hou et al., "Service Disciplines for Guaranteed Performance Service," Proceedings-Fourth International Workshop on Real-Time Computing Systems and Applications, Oct. 27-29, 1997, pp. 244-250, Taipei.

Hagai et al., "Multiple Priority, Per Flow, Dual GCRA Rate Controller for ATM Switches," Electrical and Electronic Engineers in Israel, 2000. The 21st IEEE Convention, Apr. 11-12, 2000, pp. 479-482, Tel-Aviv, Israel.

Kim et al., "Three-level Traffic Shaper and its Application to Source Clock Frequency Recovery for VBR Services in ATM Networks," IEEE/ACM Transaction on Networking (TON), vol. 3, Issue 4, Aug. 1995, pp. 450-458.

Dixit et al., "Traffic Descriptor Mapping and Traffic Control for Frame Relay Over ATM Network," IEEE/ACM Transactions on Networking (TON), vol. 6, Issue 1, Feb. 1998, pp. 56-70.

Bennett et al., "WF$_2$Q: Worst-case Fair Weighted Fair Queueing," INFOCOM '96. Fifteenth Annual Joint Conference of the IEEE Computer Societies Networking the Next Generation. Proceedings IEEE. Mar. 24-28, 1996, vol. 1, pp. 120-128.

Bennett et al., "High-Speed, Scalable, and Accurate Implementation of Fair Queueing Algorithms in ATM Networks," ICNP '97, http://www-2.cs.cmu.edu/—hzhang/papers/ICNP97.pdf, 1997.

U.S. Appl. No. 10/758,547, filed Jan. 14, 2004, Charny et al.
U.S. Appl. No. 10/422,167, filed Apr. 24, 2003, Kappler et al.
U.S. Appl. No. 11/022,246, filed Dec. 23, 2004, Cohen et al.
U.S. Appl. No. 11/070,932, filed Mar. 3, 2005, Kappler et al.
U.S. Appl. No. 11/022,220, filed Dec. 23, 2004, Shoham et al.
U.S. Appl. No. 12/426,245, filed Apr. 18, 2009, Cohen et al.

* cited by examiner

PIPELINE SCHEDULER INCLUDING A HIERARCHY OF SCHEDULERS AND MULTIPLE SCHEDULING LANES

TECHNICAL FIELD

One embodiment of the invention relates to communications and computer systems, especially routers, packet switching systems, and other devices; and more particularly, one embodiment relates to a pipeline scheduler including a hierarchy of individual schedulers with multiple scheduling lanes for scheduling items, such as, but not limited to packets or indications thereof, such that different classes of priority items can be propagated through the hierarchy of schedulers accordingly.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards a packet. For example, an enqueuing component of such a device receives a stream of various sized packets which are accumulated in an input buffer. Each packet is analyzed, and an appropriate amount of memory space is allocated to store the packet. The packet is stored in memory, while certain attributes (e.g., destination information and other information typically derived from a packet header or other source) are maintained in separate memory. Once the entire packet is written into memory, the packet becomes eligible for processing, and an indicator of the packet is typically placed in an appropriate destination queue for being serviced according to some scheduling methodology.

When there is a contention for resources, such as on output links of a packet switching system or interface or even for compute cycles in a computing device, it is important for resources to be allocated or scheduled according to some priority and/or fairness policy. Moreover, the amount of work required to schedule and to enqueue and dequeue a packet or other scheduled item is important, especially as the operating rate of systems increase. Many different mechanisms have been used by an individual scheduler to schedule packets, many of which are described hereinafter.

Ordinary time division multiplexing (TDM) is a method commonly used for sharing a common resource between several clients. All scheduled clients are served one at a time at predetermined times and for pre-allocated time periods, which is a very useful property for many applications. This method is often used for multiplexing multiple synchronous items over a higher speed communications link, such as that used for multiplexing multiple telephone calls over a single facility or interleaving packets. However, in a dynamic environment wherein items may not require the full amount of their allocated time slot such as when an item may only require none or only a portion of a particular allocated time slot, then bandwidth of the resource is typically wasted.

Ordinary round-robin (RR) is a another method commonly used for sharing a common resource between several clients. All clients are served in a cyclic order. In each round every client will be served if it is eligible. When served, each client is permitted to send one packet. Servicing of queues is simple to implement and can be done in constant time, but, due to the varying size of packets, does not allocate bandwidth fairly. For example, certain higher priority or larger bandwidth ports or streams of packets may not get their desired amount of bandwidth, which may especially be the case when serving one large and numerous smaller traffic streams or when different priorities of traffic are scheduled.

In some scenarios, high priority (e.g., low latency), guaranteed bandwidth, best effort traffic (e.g., spare bandwidth) and other classifications of traffic compete for a common resource. Various known scheduling methods are designed to provide isolation, prioritization, and fair bandwidth allocation to traffic competing for a common resource. These are known as fair queuing methods. Some examples are Weighted Fair Queuing (WFQ), Self-Clocked Fair Queuing (SCFQ), and Deficit Round Robin/Surplus Round Robin (referred to as DRR).

WFQ and SCFQ depend upon arrival times as well as previous link utilization in order to calculate the next best packet to send. The accepted "ideal" behavior is bit-by-bit or weighted bit-by-bit round robin, which states that the next packet to send should be the packet which would have completed if all packets currently in the system send one bit each round robin (which is typically not practical in a packet-based system). The inclusion of arrival times in the scheduling method, in order to calculate theoretical ideal departure times, typically requires insertion into a sorted list which is known to be an O(log N) problem worst case where N is the number of packets already enqueued.

DRR is a method used for sharing a common resource between several clients with different ratios between clients (i.e., some clients are allowed to consume more of the resources than others). The ratio between clients is typically defined by a parameter called a quantum. There are many variations and different implementations of DRR, including that described hereinafter.

DRR services queues using round-robin servicing with a quantum assigned to each queue. Unlike traditional round-robin, multiple packets up to the specified quantum can be sent resulting in each queue sending at least a quantum's worth of bytes. If the quantum for each queue is equal, then each queue will consume an equal amount of bandwidth.

This DRR approach works in rounds, where a round is one round-robin iteration over the queues that have items to be sent. Typically, when the queue is scheduled, it is allowed to transmit until its deficit becomes negative (or non-positive), and then the next queue is served. Packets coming in on different flows are stored in different queues. Each round, each queue is allocated a quantum worth of bytes, which are added to the deficit of each queue. Each queue is allowed to send out one or more packets in a DRR round, with the exact number of packets being sent in a round being dependent on its quantum and the size of the packets being sent. Typically, as long as the deficit is a positive (or non-negative) value (i.e., it is authorized to send a packet) in a DRR round for a queue and it has one or more packets to send, a packet is sent and its quantum is reduced based on the size of the sent packet. If there are no more packets in a queue after the queue has been serviced, one implementation sets the deficit corresponding to the queue to zero, while one implementation does this only if its deficit is negative. Otherwise, the remaining amount (i.e., the deficit minus the number of bits sent) is maintained for the next DRR round.

DRR is a method that does not depend upon actual arrival times and has complexity of O(1)—that is the amount of work required is a constant and independent of the number of packets enqueued. In order to be work conserving, a packet should be sent every time a queue is scheduled no matter its size. Thus, the quantum used in DRR should be at least one maximum packet size (MTU) to guarantee that when the quantum is added to any deficit, the resulting value is at least zero. DRR provides fair bandwidth allocation and is easy to implement. It is work conserving and, because of its O(1) properties, it scales well with higher link speeds and larger number of queues. However, its scheduling behavior deviates quite a bit from the bit-by-bit round robin "ideal". In particular, latency for a system with N queues is Q*N where Q is the average quantum, which must be at least one maximum transmission unit (MTU).

These scheduling techniques can work well for scheduling a single layer of service. However, bandwidth is being sold to end customers based on types and aggregation of traffic. For example, customers might subscribe to certain types of traffic with different delay and bandwidth requirements, such as voice, video, gaming, email, instant messaging, and Internet browsing. Some of these traffic types can be very time and delay sensitive, while other types of traffic can be serviced using a best effort without too much impact on the service. Additionally, this traffic may be aggregated into a digital subscriber line (DSL) or virtual LAN (VLAN) services, which typically have their own service requirements, especially including a maximum subscribed rate. If a policer function is used to limit the traffic rate, then packets are typically dropped or service backpressured. However, indiscriminate dropping of packets or throttling of all types of traffic can especially impact services which are delay and bandwidth sensitive (e.g., voice and video services). Needed are new ways to accommodate different types and aggregations of traffic.

SUMMARY

Disclosed are, inter alia, methods, apparatus, data structures, computer-readable medium, and mechanisms, which may include or be used with a hierarchy of individual schedulers with multiple scheduling lanes for scheduling items, such as, but not limited to packets or indications thereof, such that different classes of priority items can be propagated through the hierarchy of schedulers accordingly. One embodiment includes a pipeline scheduler having a root scheduler and one or more layers of schedulers with each of these layers including at least one scheduler. Each scheduler of the pipeline scheduler is configured to maintain items of different scheduling categories received from each of the particular scheduler's immediate children schedulers within the pipeline scheduler if any and/or from each immediate external source coupled to the particular scheduler if any, and to schedule the sending of the items of the different scheduling categories currently maintained to its parent schedule or external scheduler client.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
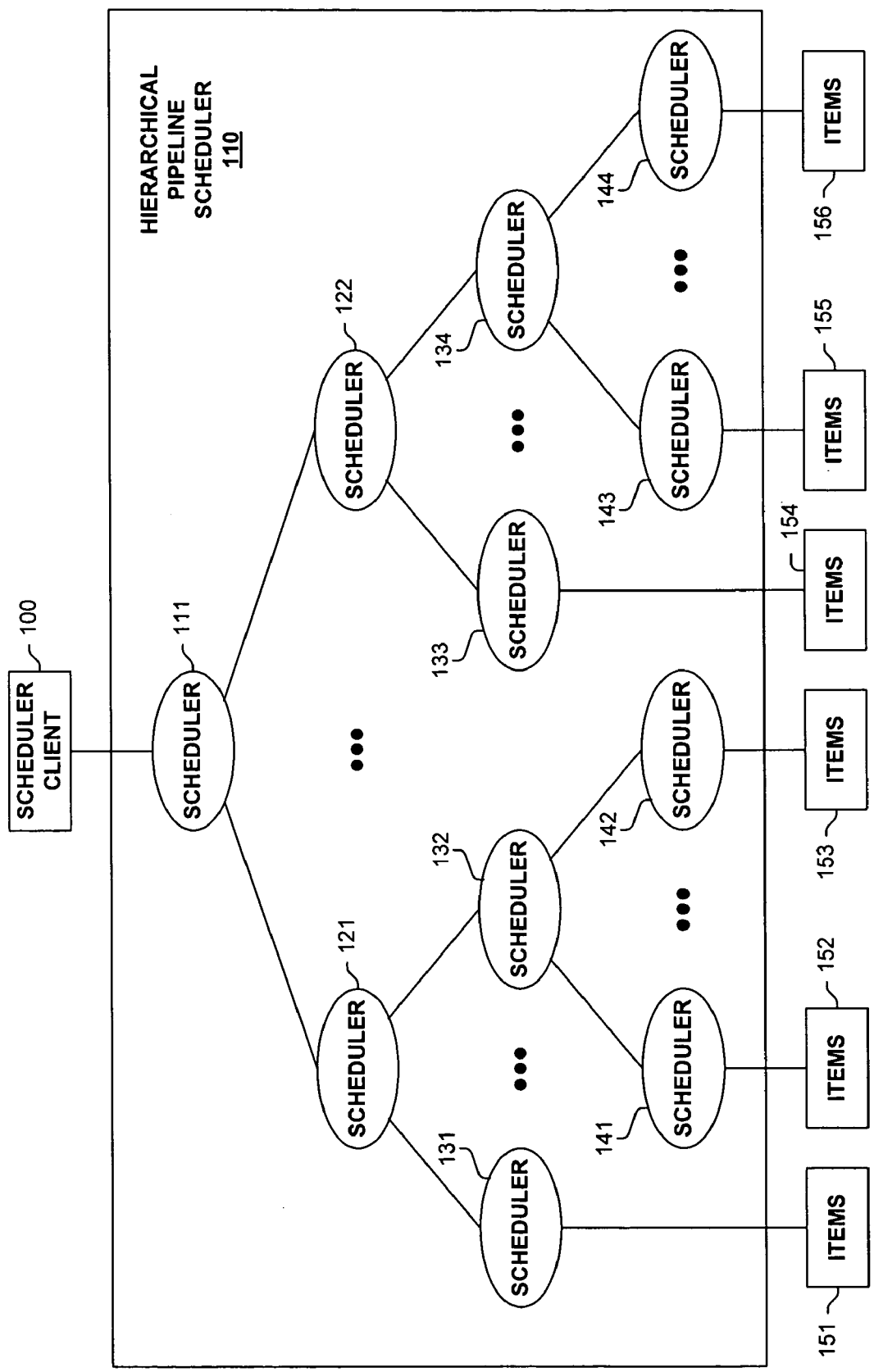
FIG. 1A is a block diagram of an exemplary hierarchical pipelined scheduler used in one embodiment.

Disclosed are, inter alia, methods, apparatus, data structures, computer-readable medium, and mechanisms, which may include or be used with a hierarchy of individual schedulers with multiple scheduling lanes for scheduling items, such as, but not limited to packets or indications thereof, such that different classes of priority items can be propagated through the hierarchy of schedulers accordingly.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, and mechanisms, which may include or be used with a hierarchy of individual schedulers with multiple scheduling lanes for scheduling items, such as, but not limited to packets or indications thereof, such that different classes of priority items can be propagated through the hierarchy of schedulers accordingly. One embodiment includes a pipeline scheduler having a root scheduler and one or more layers of schedulers with each of these layers including at least one scheduler. Each scheduler of the pipeline scheduler is configured to maintain items of different scheduling categories received from each of the particular scheduler's immediate children schedulers within the pipeline scheduler if any and/or from each immediate external source coupled to the particular scheduler if any, and to schedule the sending of the items of the different scheduling categories currently maintained to its parent schedule or external scheduler client.

In one embodiment, the different scheduling categories include a high-priority traffic category and a rate-based traffic category. In one embodiment, each scheduler of the pipeline scheduler schedules traffic independently of other schedulers within the pipeline scheduler. In one embodiment, the scheduling traffic includes rate-based scheduling of items corresponding to the rate-based traffic category. In one embodiment, different scheduling categories further includes a low priority traffic category. In one embodiment, the low priority traffic category is of an intermediate priority below a high priority traffic and above another scheduling category (e.g., rate-based traffic, a lower strict priority category, a served over rate category, etc.). In one embodiment, a scheduler uses the same scheduling mechanism for each of the different categories of traffic. In one embodiment, the scheduler uses multiple different scheduling mechanisms in order to appropriately schedule the different scheduling categories (e.g., scheduling rate-based traffic is typically different than scheduling strict-priority based traffic). In one embodiment, the items are packets or indications corresponding to packets.

In one embodiment, each particular parent scheduler of the pipeline scheduler having one or more children schedulers in the one or more layers of schedulers, in response to selecting an item of a particular scheduling category of the different scheduling categories to forward to its parent scheduler which was received from a corresponding child scheduler of its the one or more children schedulers, is configured to request a next item of the particular scheduling category from the corresponding child scheduler. In one embodiment, the corresponding child scheduler is configured to forward to its parent scheduler, in response to the request of the next item, a best scheduled item from one of the different scheduling categories with the priority at least that of the particular scheduling category from the corresponding child scheduler. In one embodiment, the corresponding child scheduler is configured to forward to its parent scheduler, in response to the request of the next item of the particular scheduling category, a best scheduled item for the particular scheduling category in the particular parent scheduler. In one embodiment, the corresponding child scheduler is configured to maintain an indication of a need by its parent scheduler for a best scheduled item of the particular scheduling category from the particular scheduler in response to the request of the next item of the particular scheduling category when it currently has no items of the particular scheduling category. In one embodiment, the corresponding child scheduler is configured to forward to the particular parent scheduler, in response to the maintained indication of the need by its parent scheduler for the best scheduled item of the particular scheduling category and the receipt of a new item of the particular scheduling category, the new item of the particular scheduling category.

In one embodiment, each scheduler of the pipeline scheduler includes storage for one item of each of the different scheduling categories for each of its immediate child schedulers or external sources. In one embodiment, each scheduler of the pipeline scheduler includes a first scheduling mechanism for scheduling a first category of the different scheduling categories and a second scheduling mechanism for scheduling a second category of the different scheduling categories, wherein the first and second scheduling mechanisms schedule items using a different scheduling technique. In one embodiment, each scheduler of the one or more layers of schedulers is configured to identify whether or not its parent scheduler needs an item of a particular category of different scheduling categories, and it responds to at least receiving a particular item of the particular category and the identification that the parent needs an item of the particular category by forwarding the particular item to the parent scheduler.

One embodiment schedules items corresponding to multiple different priority scheduling categories in a pipeline scheduler including a hierarchy of schedulers, the hierarchy of schedulers including a particular scheduler having multiple particular child schedulers and a particular parent scheduler. One embodiment receives a request from the particular parent scheduler, the request including an identification of a particular scheduling category of the multiple different priority scheduling categories. In response to receiving the request, a best item of currently stored items which were received from the multiple particular child schedulers and corresponding to the particular scheduling category is forwarded to the particular parent scheduler, the best item having been received from a particular child scheduler of the multiple particular child schedulers. Additionally, a replacement item of the particular scheduling category is requested from the particular child scheduler.

One embodiment schedules items corresponding to multiple different priority scheduling categories in a pipeline scheduler including a hierarchy of schedulers, the hierarchy of schedulers including a particular scheduler having multiple particular child schedulers and a particular parent scheduler. One embodiment receives a request from the particular parent scheduler, the request including an identification of a particular scheduling category of the multiple different priority scheduling categories. In response to receiving the request, an identification is made that the particular parent scheduler does not currently have an item of a higher priority scheduling category than the particular scheduling category, and then a best item of currently stored items which were received from the multiple particular child schedulers and corresponding to the higher priority scheduling category than the particular scheduling category is forwarded to the particular parent scheduler, the best item having been received from a particular child scheduler of the multiple particular child schedulers, and requesting a replacement item of the higher priority scheduling category from the particular child scheduler.

One embodiment schedules items corresponding to multiple different priority scheduling categories in a pipeline scheduler including a hierarchy of schedulers, the hierarchy of schedulers including a particular scheduler having multiple particular child schedulers and a particular parent scheduler. One embodiment receives a particular item from one of the multiple particular child schedulers, the particular item corresponding to a particular scheduling category of the multiple scheduling categories. A recognition is made that the parent scheduler does not have an item from the particular scheduler corresponding to the particular scheduling category, and in response, sending the particular item to the particular parent scheduler.

In one embodiment, the particular scheduler maintains a parent status data structure indicating whether or not the particular parent scheduler desires an item of each particular scheduling category of the multiple scheduling categories. In one embodiment, the recognition that the particular parent scheduler does not have an item from the particular scheduler corresponding to the particular scheduling category includes checking the parent status data structure. In one embodiment, the parent scheduler forwards items of different categories of the plurality of different scheduling categories to a single category of the plurality of different scheduling categories in its parent. In one embodiment, the parent of the parent scheduler treats items received from at least two different scheduling categories in the parent scheduler as from a same scheduling category of the plurality of different scheduling categories.

One embodiment schedules items corresponding to multiple different priority scheduling categories in a pipeline scheduler including a hierarchy of schedulers, the hierarchy of schedulers including a particular scheduler having multiple particular child schedulers and a particular parent scheduler. One embodiment maintains indications of each of the multiple different priority scheduling categories for which the particular parent scheduler needs an item. A request is received for the particular parent scheduler, the request including an identification of a particular scheduling category of the multiple different priority scheduling categories. The indications of each of the multiple different priority scheduling categories for which the particular parent scheduler needs an item are updated to reflect the received request. An identified scheduling category of the multiple different priority scheduling categories is identified based on the indications of each of the multiple different priority scheduling categories for which the particular parent scheduler needs an item, and in response: forwarding to the particular parent scheduler a best item of currently stored items which were received from the multiple particular child schedulers and corresponding to the identified scheduling category, the best item having been received from a particular child scheduler of the multiple particular child schedulers, and requesting a replacement item of the identified scheduling category from the particular child scheduler.

In one embodiment, the identified scheduling category is the same as the particular scheduling category. In one embodiment, the identified scheduling category is a higher priority scheduling category than the particular scheduling category. In one embodiment, the identified scheduling category is the highest priority scheduling category in the multiple different priority scheduling categories for which an item is available to forward to the particular parent scheduler and an item is identified as being needed in the indications for which the particular parent scheduler needs an item.

In one embodiment the items are packets or indications corresponding to packets. In one embodiment, the best item is rate scheduled and the particular scheduler includes a rate scheduling data structure, and the method further comprises updating the rate scheduling data structure based on the best item.

FIG. 1A is a block diagram of an exemplary hierarchical pipelined scheduler 110 used in one embodiment. As illustrated, items 151-156 are received by hierarchical pipelined scheduler 110 and are propagated through one or more schedulers 121-144 to reach scheduler 111 and then forwarded to the scheduler client 100. Scheduler 111 is sometimes referred to as the root scheduler as it corresponds the root of a tree formed by schedulers 121-144. Each of the schedulers 111-144 schedules traffic independently, which typically includes two or more different scheduling categories (e.g., high-priority traffic, low-priority, rate-based traffic, etc.) By providing multiple scheduling lanes corresponding to different categories of traffic, items of a higher priority can propagate through hierarchical pipelined scheduler 110 without being blocked by or wait behind lower priority traffic. Note, each scheduler typically has a single parent scheduler or external client, and one or more child schedulers and/or external sources for items. The number of schedulers and their arrangement in an embodiment using a hierarchical pipeline scheduler is typically determined based on the needs of the application of the embodiment.

Figure 1B:
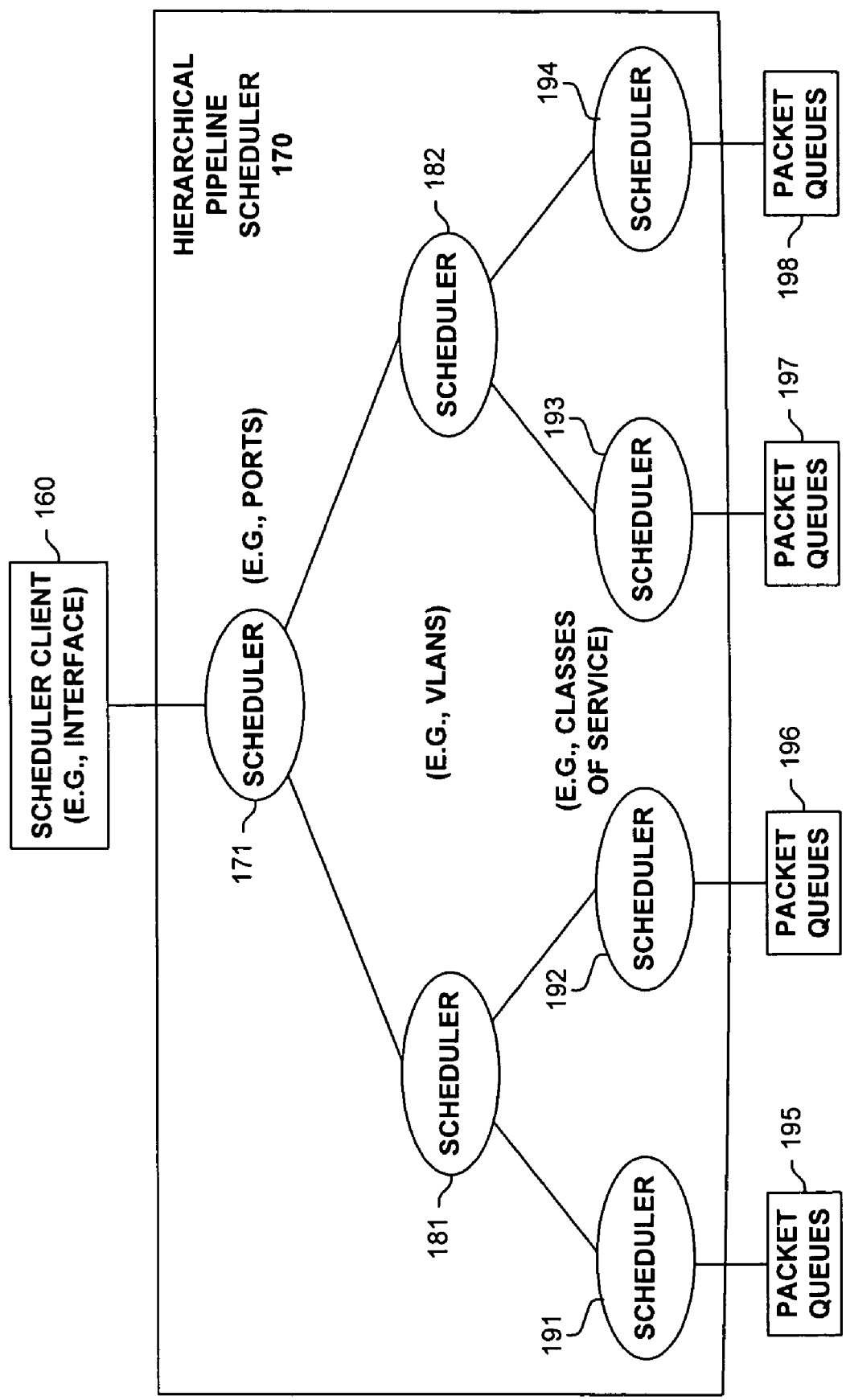
FIG. 1B is a block diagram of an exemplary hierarchical pipelined scheduler used in one embodiment.

FIG. 1B illustrates an example use of hierarchical pipeline scheduler 170 in the context of items being packets or indications corresponding to packets. Note, one embodiment of a hierarchical pipelined scheduler is used for scheduling ingress packet traffic, and one embodiment of a hierarchical pipelined scheduler is used for scheduling egress packet traffic. In the illustrated example, hierarchical pipeline scheduler 170 is responsible for scheduling the sending of packets received from packet queues 195-198. Hierarchical pipelined scheduler 170 accomplishes this using multiple scheduling layers: a class of service scheduling layer using schedulers 191-194, with their parent schedulers 181-182 corresponding to a VLAN scheduling layer, with their parent scheduler 171 corresponding to a port scheduler, which provides the packets or indications thereof to scheduler client 160, corresponding to an interface.

Each of the schedulers 171-194 schedules traffic independently, which typically includes two or more different scheduling categories (e.g., high-priority traffic, low-priority, rate-based traffic, etc.) By providing multiple scheduling lanes corresponding to different categories of traffic, packets or indications thereof of a higher priority can propagate through hierarchical pipelined scheduler 110 without being blocked by or wait behind lower priority traffic. Note, each scheduler typically has a single parent scheduler or external client, and one or more child schedulers and/or external sources for items. The number of schedulers and their arrangement in an embodiment using a hierarchical pipeline scheduler is typically determined based on the needs of the application of the embodiment.

Figure 2:
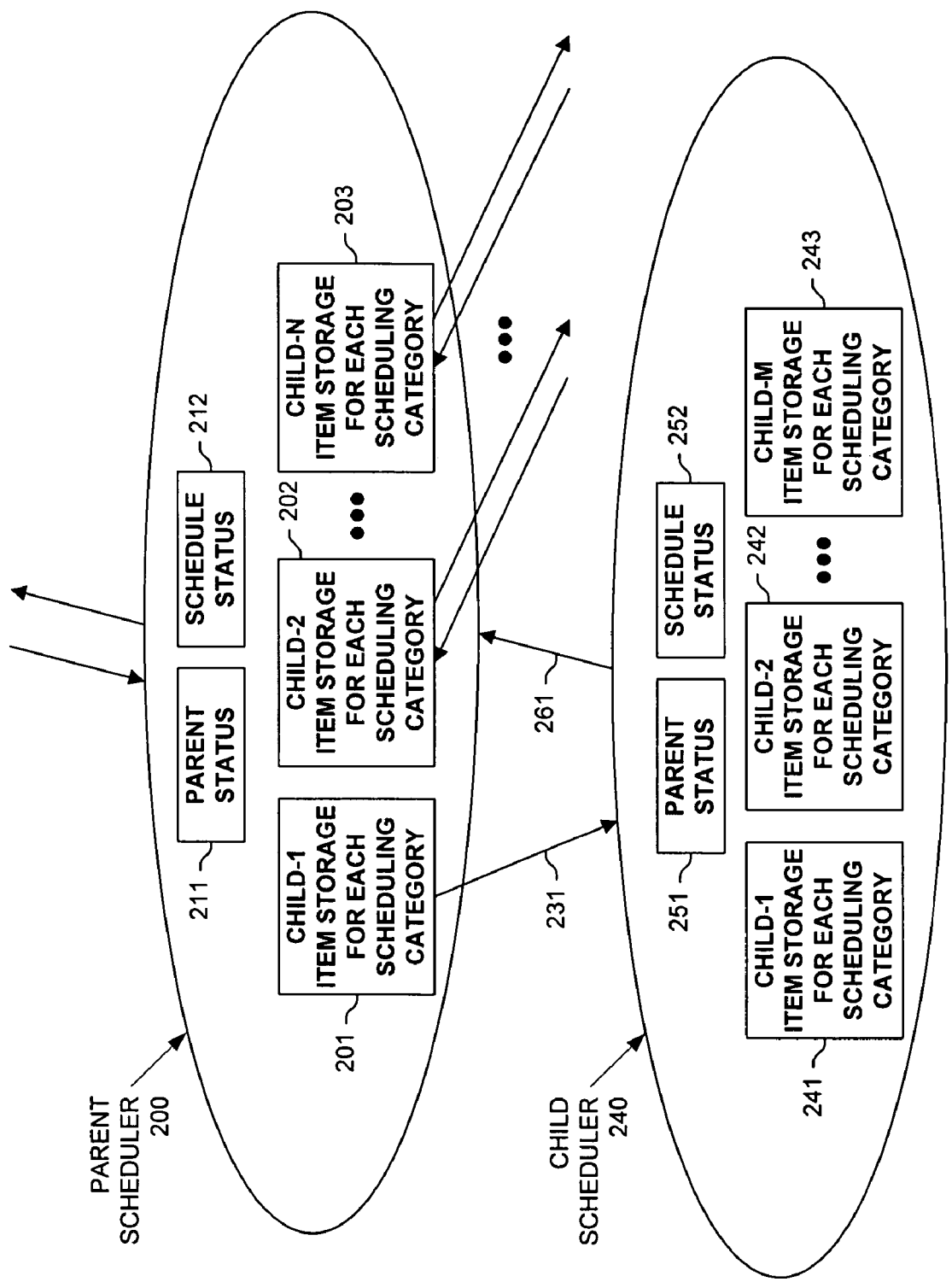
FIG. 2 is a block diagram illustrating a parent scheduler and one of its child schedulers used in one embodiment.

FIG. 2 is used to describe a parent scheduler 200 and one of its child schedulers 240 used in one embodiment. As shown, parent scheduler 200 includes storage 201-203 for items received from each of its children schedulers (240 and others not shown) for each scheduling category (e.g., high-priority traffic, low-priority traffic, rate-based traffic, or whatever categories match the needs of the application of the embodiment). By segregating the items by scheduling categories received from different child schedulers, parent scheduler 200 is able to propagate different types or priorities of traffic ahead of other traffic, even if such traffic was received earlier. Similarly, child scheduler 240 includes storage 241-243 for items received from each of its children schedulers for each scheduling category.

Any type of scheduling mechanism can be used to identify the best item from the items received its child schedulers or external sources. For example, one embodiment uses two types of traffic categories: a high-priority traffic and rate-based traffic. Items of the high-priority traffic are scheduled to be strictly forwarded before any rate-based items, with the rate-based traffic being scheduled (e.g., using a calendar scheduler, DRR, or other scheduling mechanism) in the remaining bandwidth.

One embodiment also maintains one or more data structures indicating the categories of traffic which it currently has stored, and those categories which its parent scheduler has stored or needs from it. For example, parent scheduler 200 maintains parent status information 211 and its schedule status information 212, and child scheduler 240 maintains parent status information 251 (i.e., corresponding to parent scheduler 200) and its schedule status information 252. In this manner, a child scheduler can readily determine (e.g., based on a comparison of its maintained parent and own status information) which type of traffic it has available to forward to its parent scheduler and which matches the needs of its parent scheduler. In one embodiment, each scheduler stores up to a single item of each category from each of its child schedulers or external item sources, and uses one or more bitmaps to maintain this status information. In one embodiment, each scheduler stores up to more than one item of each category from each of its child schedulers or external item sources, and uses one or more sets of counters to maintain this status information. Note, in one embodiment, one or more scheduling categories are consolidated into fewer and/or a single scheduling category by a sending scheduler and/or a receiving scheduler.

Figure 3A:
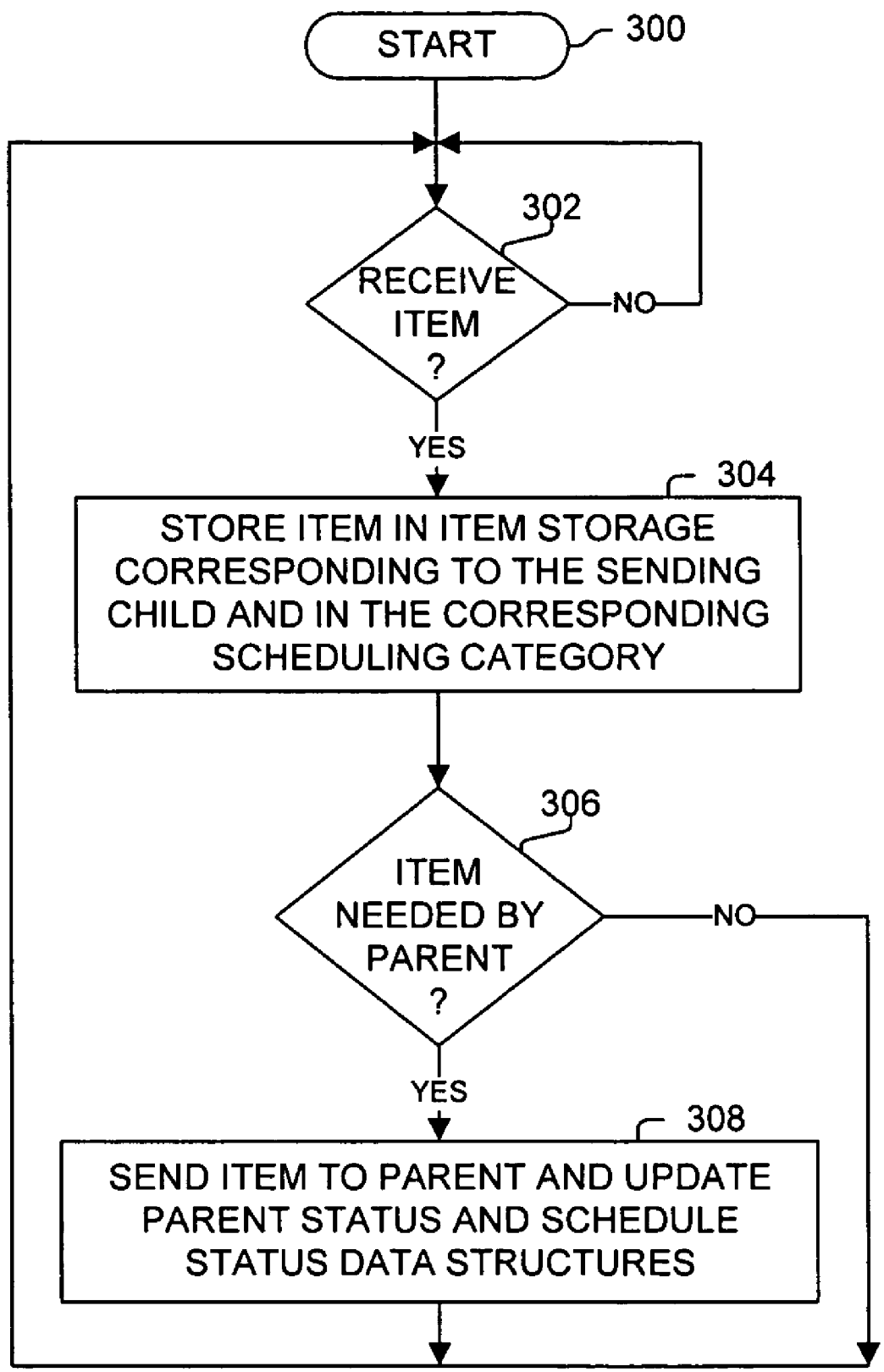
FIGS. 3A-C are flow diagrams of processes for propagating items through a hierarchical pipelined scheduler in one embodiment.

FIG. 3A illustrates a process used in one embodiment for propagating items to a parent scheduler upon startup or in response to a previously unfulfilled request to this child scheduler for an item of the particular scheduling category. Processing begins with process block 300. As determined in process block 302, if an item has been previously received, then in process block 304, the item is stored in the item storage corresponding to the sending child scheduler or external source for the scheduling category. A determination is made in process block 306, whether or not the item of that scheduling category is needed by the parent scheduler. In one embodiment, this is identified by comparing the indications of items needed in its parent status data structure with indications of items that it has received from its children in its schedule status data structure. Note, in one embodiment, items are not considered for forwarding (here and in regards to other forwarding decisions) if the propagation of its corresponding scheduling category has been halted due to a flow control or other mechanism.

As determined in process block 306, if the item of that scheduling category is needed by the parent scheduler, then in process block 308, a corresponding item is sent to its parent and the parent status and schedule status data structures are updated. However, in one embodiment, the determination in process block 306 is whether or not an item of the same or higher-priority scheduling category is needed by the parent, and an item corresponding to the highest-priority scheduling category needed (typically at or above the scheduling category of the received item) is forwarded to the parent in process block 308. Processing returns to process block 302.

Figure 3B:
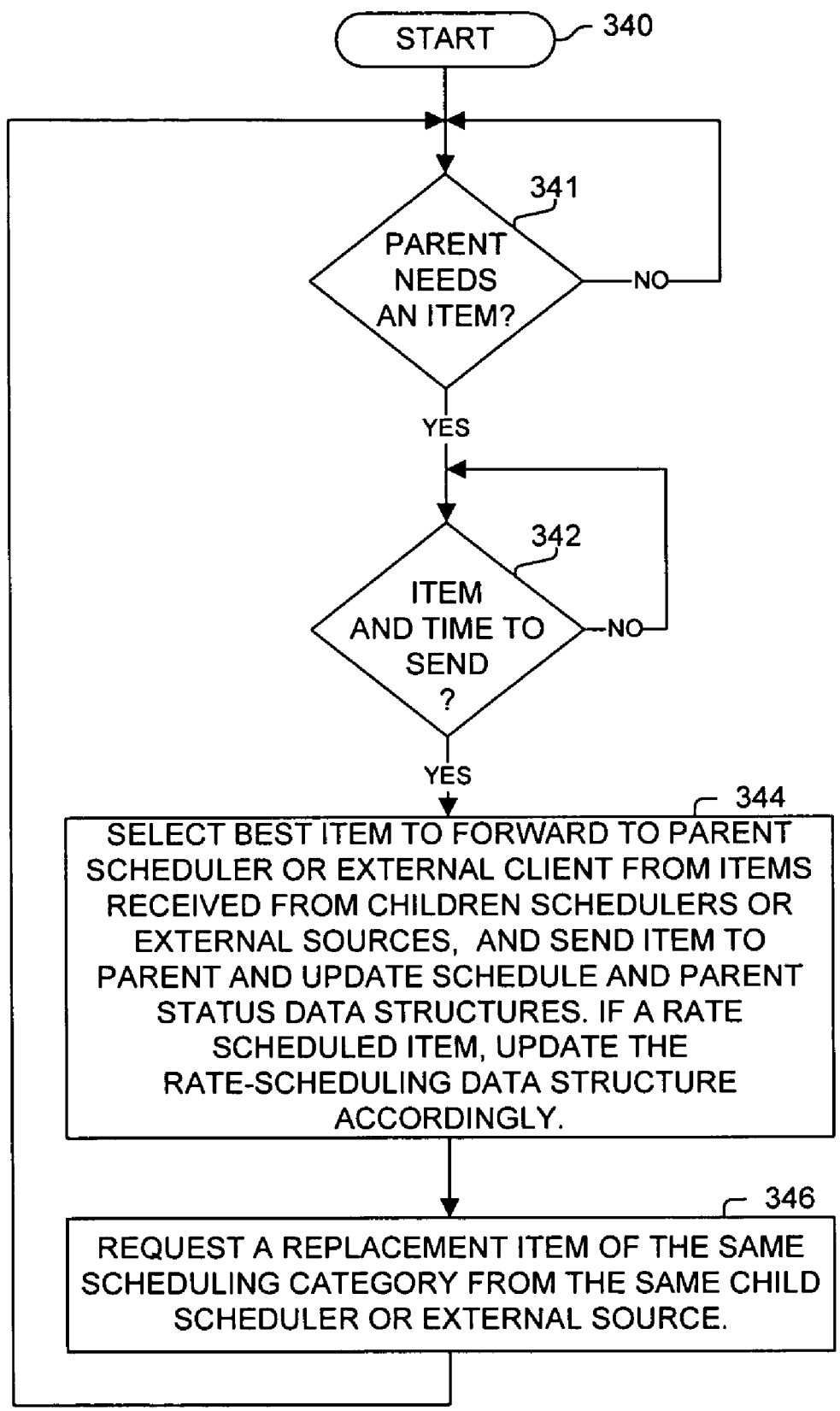

FIG. 3B illustrates a process used in one embodiment for scheduling items which have been received from its child schedulers or external sources. Processing begins at process block 340. As indicated by process block 341, processing is delayed or prevented until the parent scheduler or client needs an item. Then, as determined in process block 342, if the scheduler has an item to send (and it is time to send a next item in one embodiment), then in process block 344, a best item, typically of the highest priority scheduling category needed by the parent, to be forwarded to the parent scheduler or client is determined (or has been already determined), and this best item is sent. The scheduler's parent status and schedule status data structures are updated accordingly. Also, if the item was a rate-based item, then the rate scheduling data structure is updated.

Note, the hierarchical scheduler allows different embodiment to use different scheduling mechanisms, while providing a mechanism to schedule traffic received from several child schedulers or external sources and to allow higher priority traffic to be propagated through the pipeline of schedulers without having to wait behind lower priority traffic. Also note, in one embodiment, one or more scheduling categories are consolidated into fewer and/or a single scheduling category by a sending scheduler and/or a receiving scheduler.

In process block 346, a request for a replacement item is sent to the child scheduler or external source from which the sent item was received, typically along with an indication of the traffic category from which the sent item belongs. Processing then returns to process block 342.

Figure 3C:
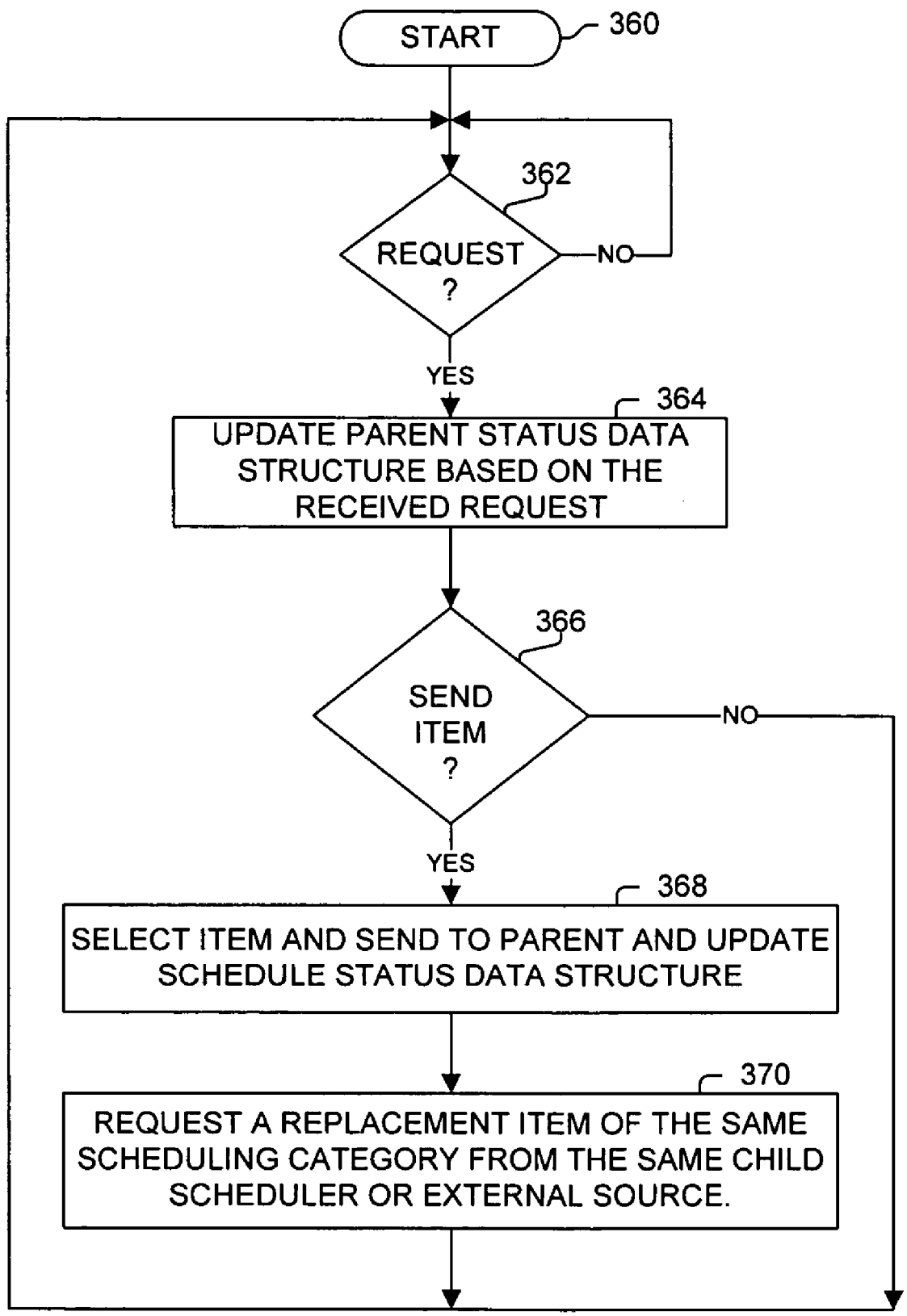

FIG. 3C illustrates a process used in one embodiment for propagating items to a parent scheduler in response to a request from the parent for an item of a particular scheduling category. Processing begins with process block 360. As determined in process block 362, if request has been received, then in process block 364, the parent data structure, which typically identifies the scheduling categories and possibly number of items for each that its parent needs, is updated based on the received request. In process block 366, a determination is made whether or not the scheduler currently has an item to send to the parent scheduler or external client. In one embodiment, this determination is simply a check to see if it has an item of the scheduling category corresponding to the received request (e.g., by checking the item storage or schedule status data structure). In one embodiment, this determination will be forced to be false even if such an item is stored in the scheduler if its parent scheduler is currently storing a higher priority item that it received from this scheduler. In other words, until the scheduler's state determines that the parent scheduler has no items of a higher priority, an item will not be forwarded to its parent scheduler. This will not delay the scheduling of the item as a parent scheduler, in determining its next scheduled item, will typically only consider items of the highest priority category received from its children. Thus, this lower priority item would not have been forwarded by the parent scheduler anyway, and by delaying its propagation, a better item might be received or determined by this scheduler in the mean time, and this approach might remove a race condition introduced by one implementation.

As determined in process block 366, if the scheduler has an item to send to the parent, then in process block 368, a best replacement item is selected from those items received from each of its child schedulers or external sources, and the selected item is sent to the parent and the schedule status and parent status data structures are updated accordingly. In one embodiment, this item is always of the same scheduling category as that indicated in the received request. In one embodiment, this item is an item of the highest priority scheduling category needed by the parent. In process block 370, a request for a replacement item of the same scheduling category as the item forwarded to the parent is sent to the child scheduler or external source from which the item sent to the parent was received. Processing returns to process block 362.

Figure 4:
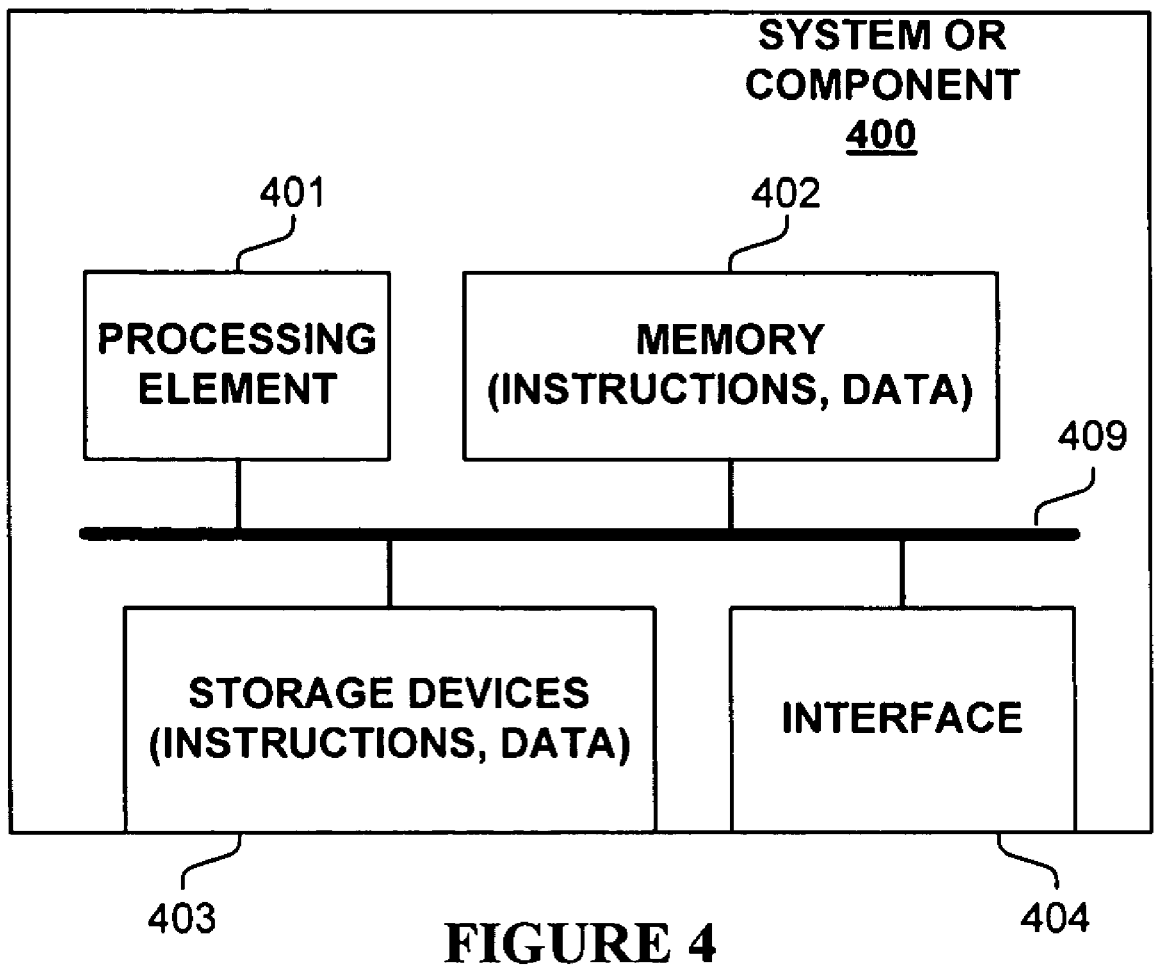
FIG. 4 is a block diagram of a scheduler used in one embodiment.

FIG. 4 is a block diagram of a an exemplary system or component 400 used in implementing a hierarchical pipelined scheduler, whether the entire hierarchical pipelined scheduler or just one or more of its schedulers. In one embodiment, system or component 400 performs one or more processes corresponding to one of the flow diagrams illustrated or otherwise described herein.

In one embodiment, component 400 includes a processing element 401 (e.g., a processor, customized logic, etc.), memory 402, storage devices 403, and an interface 404 for receiving and sending packets, items, and/or other information, which are typically coupled via one or more communications mechanisms 409 (shown as a bus for illustrative purposes.) Various embodiments of component 400 may include more or less elements. The operation of component 400 is typically controlled by processing element 401 using memory 402 and storage devices 403 to perform one or more scheduling tasks or processes. Memory 402 is one type of computer-readable medium, and typically comprises random access memory (RAM), read only memory (ROM), flash memory, integrated circuits, and/or other memory components. Memory 402 typically stores computer-executable instructions to be executed by processing element 401 and/or data which is manipulated by processing element 401 for implementing functionality in accordance with the invention. Storage devices 403 are another type of computer-readable medium, and typically comprise solid state storage media, disk drives, diskettes, networked services, tape drives, and other storage devices. Storage devices 403 typically store computer-executable instructions to be executed by processing element 401 and/or data which is manipulated by processing element 401 for implementing functionality in accordance with the invention.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising: one or more processing elements and memory; wherein said one or more processing elements are configured to implement a pipeline scheduler comprising a root scheduler and one or more layers of schedulers, each of said one or more layers including at least one scheduler, each scheduler of said one or more layers of schedulers configured to communicate selected scheduled items to its parent scheduler in the pipeline scheduler for each of a plurality of different scheduling categories; wherein said each scheduler of the pipeline scheduler is configured to simultaneously store, independently from said other schedulers in the pipeline scheduler, items of each of the plurality of different scheduling categories for, and received from, each of said particular scheduler's immediate children schedulers within the pipeline scheduler if any or from each immediate external source coupled to said particular scheduler if any, and to schedule the sending of said items of said different scheduling categories currently maintained to its parent scheduler or external scheduler client based on priorities corresponding to the different scheduling categories of said items currently stored; wherein the plurality of different scheduling categories includes a higher-priority scheduling category and a lower-priority scheduling category; and wherein said storing of items of each of the plurality of different scheduling categories corresponding to multiple scheduling lanes allows items of the higher-priority scheduling category not to be blocked by, or wait behind, items of the lower-priority scheduling category from a same children scheduler; and wherein once an item of said items of the plurality of different scheduling categories is said stored in a specific scheduler of said one or more layers of schedulers, it remains in the specific scheduler until it is selected and said communicated to its parent scheduler.

2. The apparatus of claim 1, wherein said different scheduling categories include a high-priority traffic category and a rate-based traffic category; and wherein said scheduling traffic includes rate-based scheduling of items corresponding to said rate-based traffic category.

3. The apparatus of claim 2, wherein said different scheduling categories further includes a low-priority traffic category.

4. The apparatus of claim 1, wherein each particular parent scheduler of the pipeline scheduler having one or more children schedulers in said one or more layers of schedulers, in response to selecting an item of a particular scheduling category of said different scheduling categories to forward to its parent scheduler which was received from a corresponding child scheduler of its said one or more children schedulers, is configured to request a next item of the particular scheduling category from the corresponding child scheduler.

5. The apparatus of claim 4, wherein the corresponding child scheduler is configured to forward to its parent scheduler, in response to said request of the next item, a best scheduled item from one of the different scheduling categories with the priority at least that of the particular scheduling category from the corresponding child scheduler.

6. The apparatus of claim 4, wherein the corresponding child scheduler is configured to forward to its parent scheduler, in response to said request of the next item of the particular scheduling category, a best scheduled item for the particular scheduling category in said particular parent scheduler.

7. The apparatus of claim 4, wherein the corresponding child scheduler is configured to maintain an indication of a need by its parent scheduler for a best scheduled item of the particular scheduling category from said particular scheduler in response to said request of the next item of the particular scheduling category when it currently has no items of the particular scheduling category.

8. The apparatus of claim 7, wherein the corresponding child scheduler is configured to forward to said particular parent scheduler, in response to said maintained indication of the need by its parent scheduler for the best scheduled item of the particular scheduling category and the receipt of a new item of the particular scheduling category, the new item of the particular scheduling category.

9. The apparatus of claim 1, wherein the items are packets or indications corresponding to packets.

10. The apparatus of claim 1, wherein each scheduler of the pipeline scheduler includes storage for one item of each of said different scheduling categories for each of its immediate child schedulers or external sources.

11. The apparatus of claim 1, wherein each scheduler of the pipeline scheduler includes a first scheduling mechanism for scheduling a first category of said different scheduling categories and a second scheduling mechanism for scheduling a second category of said different scheduling categories, wherein said first and second scheduling mechanisms schedule items using a different scheduling technique.

12. The apparatus of claim 1, wherein each scheduler of said one or more layers of schedulers is configured to identify whether or not its parent scheduler needs an item of a particular category of different scheduling categories, and it responds to at least receiving a particular item of the particular category and said identification that said parent needs an item of the particular category by forwarding the particular item to said parent scheduler.

13. A method, performed by an apparatus including one or more processing elements and memory, for use in scheduling items corresponding to a plurality of different priority scheduling categories in a pipeline scheduler including a hierarchy of schedulers, the hierarchy of schedulers including a particular scheduler having a plurality of particular child schedulers and a particular parent scheduler, wherein the particular scheduler includes storage configured for simultaneously storing, independently from said other schedulers in the pipeline scheduler, items of each of the plurality of different priority scheduling categories, wherein the particular parent scheduler is configured for simultaneously storing items of each of the plurality of different priority scheduling categories received from the particular scheduler, with the particular scheduler performing operations comprising:

receiving a request from the particular parent scheduler, the request including an identification of a particular scheduling category of the plurality of different priority scheduling categories; and in response to receiving the request, forwarding to the particular parent scheduler a best item of currently stored items which were received from the plurality of particular child schedulers and corresponding to the particular scheduling category, the best item having been received from a particular child scheduler of the plurality of particular child schedulers, and requesting a replacement item of the particular scheduling category from the particular child scheduler;

wherein the plurality of different priority scheduling categories includes a higher-priority scheduling category and a lower-priority scheduling category; and wherein said storing of items of each of the plurality of different priority scheduling categories corresponding to multiple scheduling lanes allows items of the higher-priority scheduling category not to be blocked by, or wait behind, items of the lower-priority scheduling category from a same one of the plurality of particular children schedulers; and wherein once an item of said items corresponding to the plurality of different priority scheduling categories is said stored in the particular scheduler it remains in the particular scheduler until it is selected and said forwarded to the particular parent scheduler.

14. The method of claim 13, wherein the items are packets or indications corresponding to packets.

15. The method of claim 13, wherein the best item is rate scheduled and the particular scheduler includes a rate-scheduling data structure, and the method further comprises updating the rate-scheduling data structure based on the best item.

16. A method, performed by an apparatus including one or more processing elements and memory, for use in scheduling items corresponding to a plurality of different scheduling categories in a pipeline scheduler including a hierarchy of schedulers, the hierarchy of schedulers including a particular scheduler having a plurality of particular child schedulers and a particular parent scheduler, wherein the particular scheduler includes storage configured for simultaneously storing, independently from said other schedulers in the pipeline scheduler, items of each of the plurality of different scheduling categories received from each of the plurality of particular child schedulers, wherein the particular parent scheduler is configured for simultaneously storing items of each of the plurality of different scheduling categories received from the particular scheduler, with the particular scheduler performing operations comprising:

receiving a request from the particular parent scheduler, the request including an identification of a particular scheduling category of the plurality of different scheduling categories;

in response to receiving the request, identifying that the particular parent scheduler does not currently have an item of a higher-priority scheduling category than the particular scheduling category; and forwarding to the particular parent scheduler a best item of currently stored items which were received from the plurality of particular child schedulers and corresponding to the higher-priority scheduling category than the particular scheduling category, the best item having been received from a particular child scheduler of the plurality of particular child schedulers, and requesting a replacement item of the higher-priority scheduling category from the particular child scheduler;

wherein said storing of items of each of the plurality of different scheduling categories corresponding to multiple scheduling lanes allows items of the higher-priority scheduling category not to be blocked by, or wait behind, items of a lower-priority scheduling category from a same one of the plurality of particular children schedulers; and wherein once an item of said items corresponding to the plurality of different scheduling categories is said stored in the particular scheduler it remains in the particular scheduler until it is selected and said forwarded to the particular parent scheduler.

17. The method of claim 16, wherein the items are packets or indications corresponding to packets.

18. The method of claim 16, wherein the best item is rate scheduled and the particular scheduler includes a rate-scheduling data structure, and the method further comprises updating the rate-scheduling data structure based on the best item.

19. A method, performed by an apparatus including one or more processing elements and memory, for use in scheduling items corresponding to a plurality of different scheduling categories in a pipeline scheduler including a hierarchy of schedulers, the hierarchy of schedulers including a particular scheduler having a plurality of particular child schedulers and a particular parent scheduler, wherein the particular scheduler includes storage configured for simultaneously storing, independently from said other schedulers in the pipeline scheduler, items of each of the plurality of different scheduling categories received from each of the plurality of particular child schedulers, wherein the particular parent scheduler is configured for simultaneously storing items of each of the plurality of different scheduling categories received from the particular scheduler, with the particular scheduler performing operations comprising:

receiving a particular item from one of the plurality of particular child schedulers, the particular item corresponding to a particular scheduling category of the plurality of different scheduling categories; and in response to said receipt of the particular item, recognizing that the parent scheduler does not have an item from the particular scheduler corresponding to the particular scheduling category, and in response, sending the particular item to the particular parent scheduler;

wherein the plurality of different scheduling categories includes a higher-priority scheduling category and a lower-priority scheduling category; wherein said storing of items of each of the plurality of different scheduling categories corresponding to multiple scheduling lanes allows items of the higher-priority scheduling category not to be blocked by, or wait behind, items of the lower-priority scheduling category from a same one of the plurality of particular children schedulers; and wherein once an item of said items corresponding to the plurality of different scheduling categories is said stored in the particular scheduler it remains in the particular scheduler until it is selected and said forwarded to the particular parent scheduler.

20. The method of claim 19, wherein the particular scheduler maintains a parent status data structure indicating whether or not the particular parent scheduler desires an item of each particular scheduling category of the plurality of different scheduling categories.

21. The method of claim 20, wherein said recognizing that the particular parent scheduler does not have an item from the particular scheduler corresponding to the particular scheduling category includes checking the parent status data structure.

22. The method of claim 19, wherein the items are packets or indications corresponding to packets.

23. The method of claim 19, wherein the best item is rate scheduled and the particular scheduler includes a rate-scheduling data structure, and the method further comprises updating the rate-scheduling data structure based on the best item.

24. The method of claim 19, wherein the parent scheduler forwards items of different categories of the plurality of different scheduling categories to a single category of the plurality of different scheduling categories in its parent.

25. The method of claim 19, wherein the parent of the parent scheduler treats items received from at least two different scheduling categories in the parent scheduler as from a same scheduling category of the plurality of different scheduling categories.

26. A method, performed by an apparatus including one or more processing elements and memory, for use in scheduling items corresponding to a plurality of different priority scheduling categories in a pipeline scheduler including a hierarchy of schedulers, the hierarchy of schedulers including a particular scheduler having a plurality of particular child schedulers and a particular parent scheduler, wherein the particular scheduler includes storage configured for simultaneously storing, independently from said other schedulers in the pipeline scheduler, items of each of the plurality of different scheduling categories received from each of the plurality of particular child schedulers, wherein the particular parent scheduler is configured for simultaneously storing items of each of the plurality of different scheduling categories received from the particular scheduler, with the particular scheduler performing operations comprising:

maintaining indications of each of the plurality of different priority scheduling categories for which the particular parent scheduler needs an item;

receiving a request from the particular parent scheduler, the request including an identification of a particular scheduling category of the plurality of different priority scheduling categories;

updating said indications of each of the plurality of different priority scheduling categories for which the particular parent scheduler needs an item to reflect the received request; and identifying an identified scheduling category of the plurality of different priority scheduling categories based on said indications of each of the plurality of different priority scheduling categories for which the particular parent scheduler needs an item, and in response: forwarding to the particular parent scheduler a best item of currently stored items which were received from the plurality of particular child schedulers and corresponding to the identified scheduling category, the best item having been received from a particular child scheduler of the plurality of particular child schedulers, and requesting a replacement item of the identified scheduling category from the particular child scheduler;

wherein the plurality of different priority scheduling categories includes a higher-priority scheduling category and a lower-priority scheduling category;

wherein said storing of items of each of the plurality of different priority scheduling categories corresponding to multiple scheduling lanes allows items of the higher-priority scheduling category not to be blocked by, or wait behind, items of the lower-priority scheduling category from a same one of the plurality of particular children schedulers; and wherein once an item of said items corresponding to the plurality of different scheduling categories is said stored in the particular scheduler it remains in the particular scheduler until it is selected and said forwarded to the particular parent scheduler.

27. The method of claim 26, wherein the items are packets or indications corresponding to packets.

28. The method of claim 26, wherein the best item is rate scheduled and the particular scheduler includes a rate-scheduling data structure, and the method further comprises updating the rate-scheduling data structure based on the best item.

29. The method of claim 26, wherein the identified scheduling category is the same as the particular scheduling category.

30. The method of claim 26, wherein the identified scheduling category is a higher priority scheduling category than the particular scheduling category.

31. The method of claim 26, wherein the identified scheduling category is the highest priority scheduling category in the plurality of different priority scheduling categories for which an item is available to forward to the particular parent scheduler and an item is identified as being needed in said indications for which the particular parent scheduler needs an item.

32. The apparatus of claim 1, wherein each said immediate external source is only coupled to a single scheduler of said one or more layers of schedulers.

33. The apparatus of claim 32, wherein said one or more layers of schedulers includes at least two or more layers of schedulers.

34. The apparatus of claim 32, wherein said one or more layers of schedulers includes at least two or more layers of schedulers.

* * * * *